United States Patent
Ikeda et al.

(10) Patent No.: US 8,443,116 B2
(45) Date of Patent: May 14, 2013

(54) INFORMATION PROCESSING SYSTEM, INFORMATION PROCESSING UNIT AND COMPUTER READABLE MEDIUM

(75) Inventors: Hitoshi Ikeda, Kanagawa (JP); Toshiroh Shimada, Kanagawa (JP); Naoki Hayashi, Kanagawa (JP); Tomoyuki Shoya, Kanagawa (JP); Yasunori Saito, Tokyo (JP); Hajime Ueno, Kanagawa (JP); Masamichi Takahashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 117 days.

(21) Appl. No.: 12/613,225

(22) Filed: Nov. 5, 2009

(65) Prior Publication Data

US 2010/0262725 A1 Oct. 14, 2010

(30) Foreign Application Priority Data

Apr. 13, 2009 (JP) ................................. 2009-096618

(51) Int. Cl.
*G06F 3/00* (2006.01)

(52) U.S. Cl.
USPC ............................................. 710/15; 710/17

(58) Field of Classification Search ................ 710/8, 15, 710/17; 358/1.14, 1.15
See application file for complete search history.

(56) References Cited

U.S. PATENT DOCUMENTS

| | | | | |
|---|---|---|---|---|
| 6,809,830 | B1 * | 10/2004 | Lafky | 358/1.13 |
| 7,206,830 | B2 * | 4/2007 | Yamazaki | 709/223 |
| 7,356,160 | B2 * | 4/2008 | Shibaki et al. | 382/100 |
| 2002/0035627 | A1 * | 3/2002 | Sutou et al. | 709/224 |
| 2004/0210897 | A1 * | 10/2004 | Brockway et al. | 717/174 |
| 2005/0044167 | A1 | 2/2005 | Kobayashi et al. | |
| 2005/0141014 | A1 * | 6/2005 | Kikuchi et al. | 358/1.14 |
| 2006/0033947 | A1 * | 2/2006 | Kadota | 358/1.14 |
| 2006/0072174 | A1 * | 4/2006 | Koike et al. | 358/537 |
| 2006/0167906 | A1 * | 7/2006 | Ikeda et al. | 707/100 |

FOREIGN PATENT DOCUMENTS

| | | |
|---|---|---|
| JP | A-4-82357 | 3/1992 |
| JP | A-2000-115735 | 4/2000 |
| JP | A-2002-288100 | 10/2002 |
| JP | A-2003-87247 | 3/2003 |
| JP | A-2007-4611 | 1/2007 |
| JP | A-2008-170581 | 7/2008 |

OTHER PUBLICATIONS

Printing and Imaging Support on HP Compaq Thin clients, Aug. 2006, HP, pp. 1-5.*

* cited by examiner

*Primary Examiner* — Ernest Unelus
(74) *Attorney, Agent, or Firm* — Oliff & Berridge, PLC

(57) ABSTRACT

An information processing unit includes: a display unit detection unit that detects whether an external display unit is connected to the information processing unit; a transmission unit that transmits, to the other information processing units, a fact that the external display unit is connected when the display unit detection unit detects that the external display unit is connected; and a control unit that performs control so that information transmitted from the other information processing units is displayed on the external display unit.

3 Claims, 14 Drawing Sheets

INFORMATION PROCESSING SYSTEM, INFORMATION PROCESSING UNIT AND COMPUTER READABLE MEDIUM

CROSS-REFERENCE TO RELATED APPLICATIONS

This application is based on and claims priority under 35 USC 119 from Japanese Patent Application No. 2009-096618 filed on Apr. 13, 2009.

BACKGROUND

1. Technical Field

The present invention relates to an information processing system, an information processing unit and a computer readable medium.

2. Related Art

Displaying information by controlling a display unit using an information processing unit is performed.

SUMMARY

According to an aspect of the invention, an information processing system includes: a first information processing unit; and a second information processing unit that is connected to the first information processing unit so as to be communicable therewith. The first information processing unit includes: a first display unit detection unit that detects whether an external display unit is connected to the first information processing unit or not; a first transmission unit that transmits, to the other information processing units, a fact that the external display unit is connected, when the first display unit detection unit detects that the external display unit is connected; and a control unit that performs control so that information transmitted from a second information processing unit among the other information processing units is to be displayed on the external display unit. The second information processing unit includes: a second display unit detection unit that detecting whether the external display unit is connected; and a second transmission unit that transmits, to the first information processing unit to which the display unit is connected, information to be displayed on the display unit when the second display unit detection unit detects that the external display unit is not connected.

BRIEF DESCRIPTION OF THE DRAWINGS

Exemplary embodiment(s) of the present invention will be described in detail based on the following figures, wherein.

DETAILED DESCRIPTION

Exemplary embodiments of the present invention will be described below on the basis of the accompanying drawings.

Figure 1:
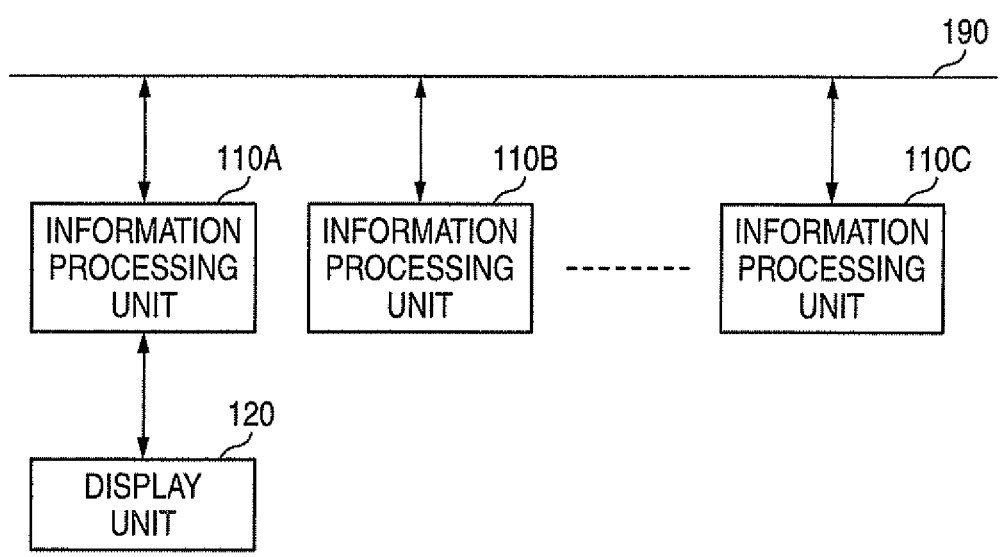
FIG. 1 is an explanatory view showing an example of the configuration of a system for achieving a first exemplary embodiment.

FIG. 1 is an explanatory view showing an example of the configuration of a system for achieving a first exemplary embodiment.

Information processing units 110A, 110B, 110C, etc. are connected via a communication line 190 so as to be able to communicate with one another. One of these information processing units, 110A, is connected to a display unit 120. For example, the information processing units 110A, 110B, 110C, etc. are each formed of a notebook-size PC (personal computer) brought into a conference room, classroom, etc. by each participant, and the display unit 120 corresponds to a projector. Furthermore, the display unit 120 is a single unit placed in the conference room, etc. and connected to the information processing unit 110A. In this situation, a case in which the display unit 120 is used by another information processing unit 100 (for example, the information processing unit 110B) will be described below. The communication line 190 may be wireless or wired. In addition, the connection between the information processing unit 110A and the display unit 120 may also be wireless or wired. However, in the case that the connection between the information processing unit 110A and the display unit 120 is wireless, the display unit 120 establishes communication with one of the information processing units 100. For example, the communication is established between two units, the distance between which is the shortest, or between two units from which a connection request is first issued.

Figure 2:
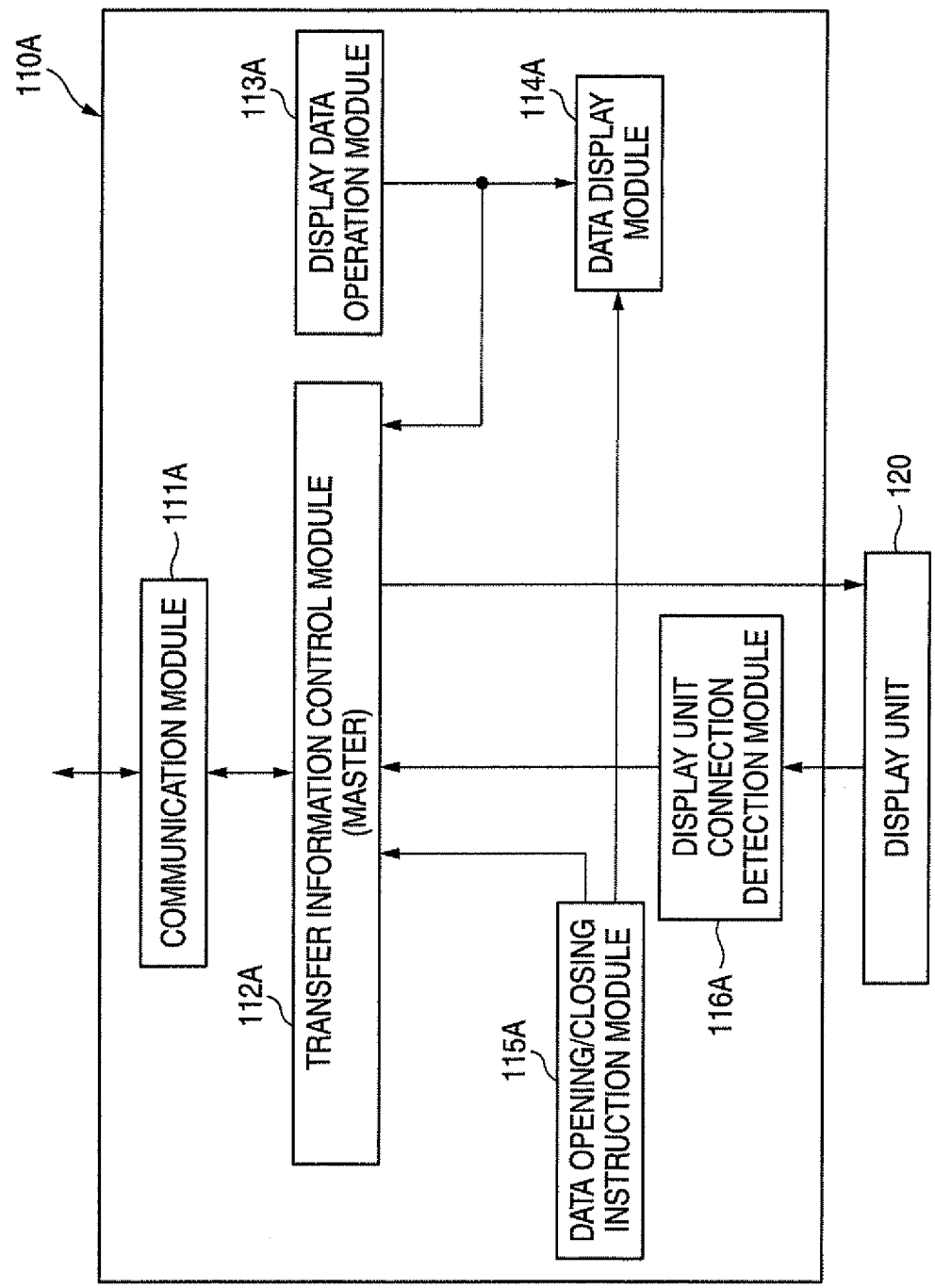
FIG. 2 is a conceptual module configuration view showing an example of the configuration of the first exemplary embodiment.

FIG. 2 is a conceptual module configuration view showing an example of the configuration of the first exemplary embodiment.

Modules generally represent components, such as logically separatable software (computer programs), hardware, etc. Hence, the modules according to the exemplary embodiment represent not only modules in computer programs but also modules in hardware configuration. The description of the exemplary embodiment is therefore also given to describe computer programs, systems and methods. However, although "store", "stored" and words equivalent to these are used in the following description for the convenience of description, in the case that the exemplary embodiment is a computer program, these words are meant to store the computer program in a storage unit or to perform control so that a storage unit stores the computer program. Furthermore, although modules almost correspond to functions on a oneto-one basis, in actual implementation, one module may be formed of one program or multiple modules may be formed of one program, or conversely one module may be formed of multiple programs. Furthermore, multiple modules may be executed by one computer or one module may be executed by multiple computers distributed or connected in parallel. In one module, other modules may be contained. Moreover, "connection" is also used in the following description to describe not only a physical connection but also a logical connection (data transmission, data instruction, reference between data, etc.).

In addition, a system or a unit is formed of multiple computers, hardware components, devices, etc. connected via a communication unit, such as a network (including one-to-one communication connection) or the like, or formed of a computer, a hardware component, a device, etc. "Unit" and "system" are used as terms synonymous with each other. "Predetermined" means that a matter has already been determined before a process to be performed starts, and is used to mean that a matter is determined before processing according to the exemplary embodiment starts, of course, or even after the processing according to the exemplary embodiment has started, depending on the situation and state encountered at the time or the situations and states encountered so far, provided that the processing according to the exemplary embodiment is performed before the process to be performed starts.

The information processing unit 110A has a communication module 111A, a transfer information control module (master) 112A, a display data operation module 113A, a data display module 114A, a data opening/closing instruction module 115A and a display unit connection detection module 116A. The display unit 120 is connected to the transfer information control module (master) 112A and the display unit connection detection module 116A of the information processing unit 110A.

The communication module 111A is connected to the transfer information control module (master) 112A and communicates with the other information processing units 110 (for example, the information processing unit 110B) via the communication line 190. For example, the communication module 111A transmits, to the other information processing units 110, the fact that the display unit 120 is connected to the information processing unit 110A and receives information to be displayed to the display unit 120 connected to the information processing unit 110A from the other information processing units 110.

The display unit connection detection module 116A is connected to the transfer information control module (master) 112A and the display unit 120 and detects whether the external display unit 120 is connected to the information processing unit 110A serving as a main unit. For example, specifically speaking, the detection is performed using a device, such as a mechanical or electrical switch. Then, the result of the detection (in the case of the information processing unit 110A, to the effect that the display unit 120 is connected to the information processing unit 110A) is transferred to the transfer information control module (master) 112A.

The transfer information control module (master) 112A is connected to the communication module 111A, the display data operation module 113A, the data opening/closing instruction module 115A, the display unit connection detection module 116A and the display unit 120. In the case that the display unit connection detection module 116A has detected that the external display unit 120 is connected to the information processing unit 110A (hereafter, this state is referred to as a master state), the information processing unit 110A transmits, to the other information processing units 110 via the communication module 111A, the fact that the external display unit 120 is connected. The information processing unit 110A receives information transmitted from, for example, the information processing unit 110B among the other information processing units, via the communication module 111A and performs control so that the information is displayed on the external display unit 120. The information transmitted from the information processing unit 110B is herein information to be displayed on the display unit 120. In other words, the information is data to be displayed using the display unit 120 by the user of the information processing unit 110B. In the case that the display unit connection detection module 116A has detected that the external display unit 120 is not connected (hereafter, this state is referred to as a slave state), this state will be described later by taking the information processing unit 110B shown in FIG. 3 as an example. That is to say, the operations of the transfer information control modules 112, etc. become different depending on the master state or the slave state.

The data opening/closing instruction module 115A is connected to the transfer information control module (master) 112A and the data display module 114A. The data opening/closing instruction module 115A instructs to open/close data (for example, electronic documents, etc. stored in the information processing unit 110A) in response to the operation of the user of the information processing unit 110A. Then, the data opening/closing instruction module 115A transfers the contents of the data to the data display module 114A so that the contents are displayed on the display of the information processing unit 110A. Furthermore, the data opening/closing instruction module 115A also transfers the contents of the data to the transfer information control module (master) 112A in the case that the contents are also displayed on the display unit 120.

The display data operation module 113A is connected to the transfer information control module (master) 112A and the data display module 114A. The display data operation module 113A accepts user's operation (scrolling, change in display position, selection, editing, etc.) for the data displayed on the display using the data opening/closing instruction module 115A. Then, the display data operation module 113A changes the data depending on the accepted operation and transfers the result of the operation to the data display module 114A. Furthermore, in the case that the data is also displayed on the display unit 120, the display data operation module 113A also transfers the result of the operation to the transfer information control module (master) 112A. Whether the data is displayed only on the display of the information processing unit 110A or displayed also on the display unit 120 (displayed on a projector as a specific example) has been set by user's operation beforehand. Depending on the setting, the display data operation module 113A and the data opening/closing instruction module 115A select whether the data to be displayed is also transferred to the transfer information control module (master) 112A.

The data display module 114A is connected to the display data operation module 113A and the data opening/closing instruction module 115A and performs control to display data on the display of the information processing unit 110A. For example, the data display module 114A performs control to display the data transferred from the data opening/closing instruction module 115A and to display the result of the operation transferred from the display data operation module 113A.

Figure 3:
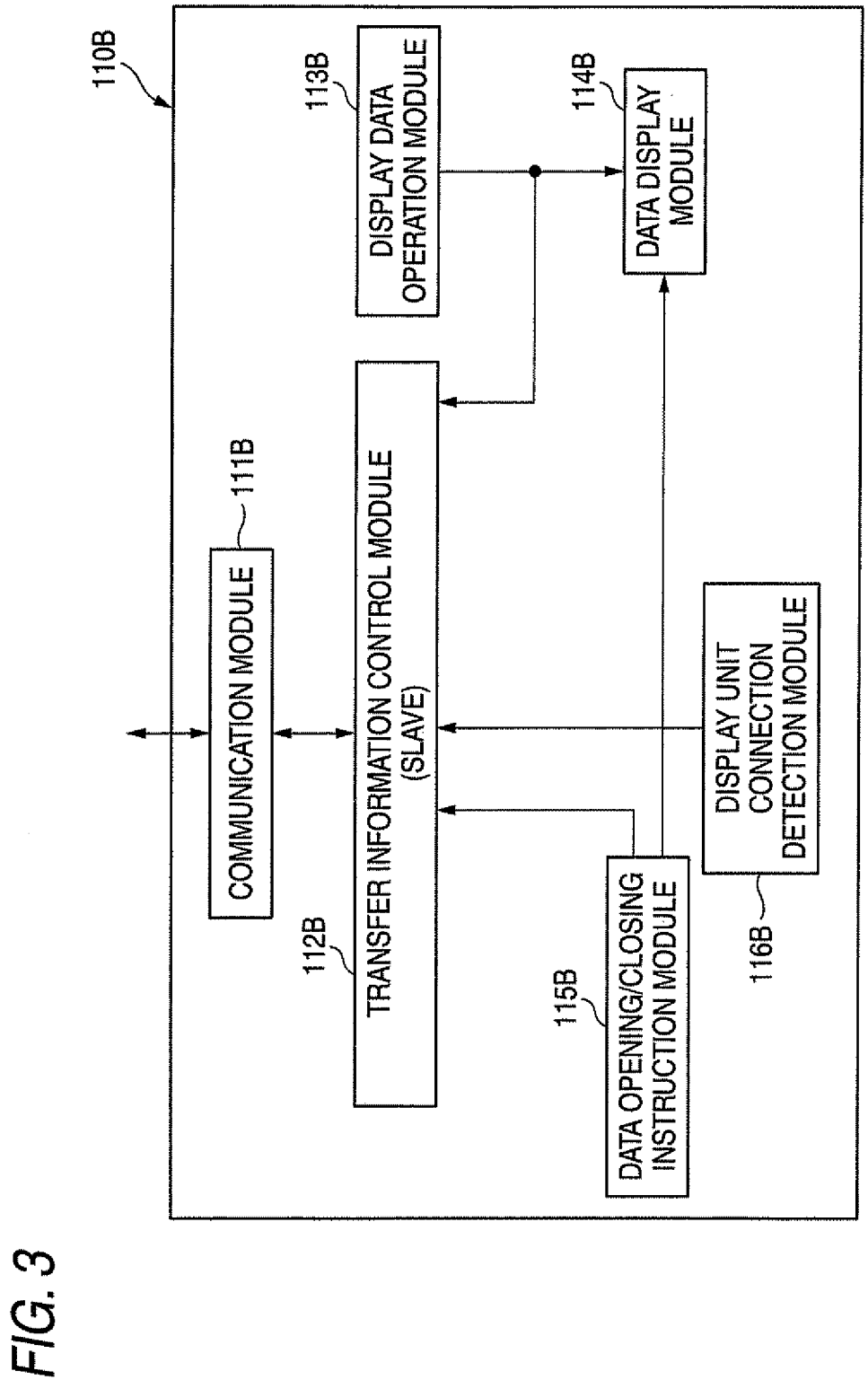
FIG. 3 is a conceptual module configuration view showing another example of the configuration of the first exemplary embodiment.

FIG. 3 is a conceptual module configuration view showing another example of the configuration of the first exemplary embodiment. The information processing unit 110B shown in the example in FIG. 3 is different from the information processing unit 110A shown in the example in FIG. 2 in that the display unit 120 is not connected. The other modules of the information processing unit 110B are basically the same as those of the information processing unit 110A. In other words, when the display unit 120 is connected, the information processing unit 110B operates as the information processing unit 110A; when the display unit 120 is not connected, the information processing unit 110B operates in its own way.

The information processing unit 110B has a communication module 111B, a transfer information control module (slave) 112B, a display data operation module 113B, a data display module 114B, a data opening/closing instruction module 115B and a display unit connection detection module 116B.

The communication module 111B is connected to the transfer information control module (slave) 112B and communicates with the other information processing units 110 (for example, the information processing unit 110A) via the communication line 190. For example, the communication module 111B receives, from the information processing unit 110A, the fact that the display unit 120 is connected and transmits information to be displayed to the display unit 120 connected to the information processing unit 110A.

The display unit connection detection module 116B is connected to the transfer information control module (slave) 112B and detects whether the external display unit 120 is connected to the information processing unit 110B serving as a main unit. Then, the result of the detection (in the case of the information processing unit 110B, to the effect that the display unit 120 is not connected to the information processing unit 110A) is transferred to the transfer information control module (slave) 112B.

The transfer information control module (slave) 112B is connected to the communication module 111B, the display data operation module 113B, the data opening/closing instruction module 115B and the display unit connection detection module 116B. In the case that the display unit connection detection module 116B has detected that the external display unit 120 is not connected, the information processing unit 1102 transmits, to another information processing unit 110 (in this case, the information processing unit 110A) to which the external display unit 120 is connected, information to be displayed on the display unit 120.

The data opening/closing instruction module 115B is connected to the transfer information control module (slave) 112B and the data display module 114B. The data opening/closing instruction module 115B instructs to open/close data (for example, electronic documents, etc. stored in the information processing unit 110B) in response to the operation of the user of the information processing unit 110B. Then, the data opening/closing instruction module 115B transfers the contents of the data to the data display module 114B so that the contents are displayed on the display of the information processing unit 110B. Furthermore, the data opening/closing instruction module 115B also transfers the contents of the data to the transfer information control module (slave) 112B in the case that the contents are also displayed on the display unit 120 connected to the information processing unit 110A.

The display data operation module 113B is connected to the transfer information control module (slave) 112B and the data display module 114B. The display data operation module 113B accepts user's operation (scrolling, selection, editing, etc.) for the data displayed on the display using the data opening/closing instruction module 115B. Then, the display data operation module 113B changes the data depending on the accepted operation and transfers the result of the operation to the data display module 114B. Furthermore, in the case that the data is also displayed on the display unit 120 connected to the information processing unit 110A, the display data operation module 113A also transfers the result of operation to the transfer information control module (slave) 112B. Whether the data is displayed only on the display of the information processing unit 110B or displayed also on the display unit 120 connected to the information processing unit 110A has been set by user's operation beforehand. Depending on the setting, the display data operation module 113B and the data opening/closing instruction module 115B select whether the data to be displayed is also transferred to the transfer information control module (slave) 112B.

The data display module 114B is connected to the display data operation module 113B and the data opening/closing instruction module 115B and performs control to display data on the display of the information processing unit 110B. For example, the data display module 114B performs control to display the data transferred from the data opening/closing instruction module 115B and to display the result of the operation transferred from the display data operation module 113B.

Figure 4:
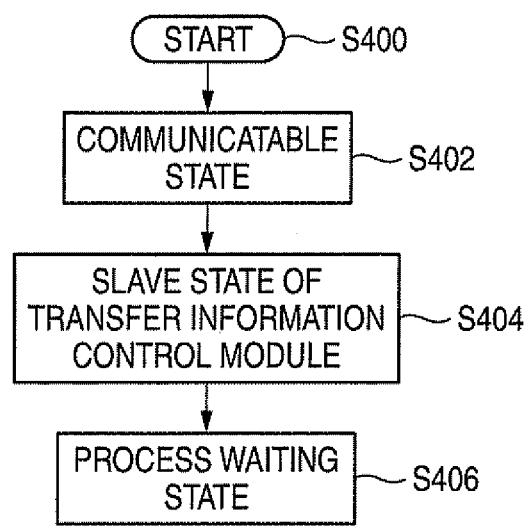
FIG. 4 is a flowchart showing a process example in the initial state of an information processing unit.

FIG. 4 is a flowchart showing a process example in the initial state of each of the information processing units 110 (the information processing unit 110A, the information processing unit 110B, etc.).

At step S402, the information processing unit 110 is in a transmittable state. For example, the power source of the information processing unit 110 is turned on, and the information processing unit 110 is connected to the communication line.

At step S404, the transfer information control module 112 is in the slave state in the initial state. In the first exemplary embodiment, the transfer information control module 112 has two states: the slave state and the master state.

At step S406, a process waiting state is generated, and the process waiting state is maintained until a predetermined time passes, the display unit 120 is connected or a data opening/closing instruction is issued by the operation of the user, for example.

Beginning from the initial state, a process example in the information processing unit 110A to which the display unit 120 is connected will be described using the example shown in FIG. 5, and a process example in the information processing unit 110B to which the display unit 120 is not connected will be described using the example shown in FIG. 6.

Figure 5:
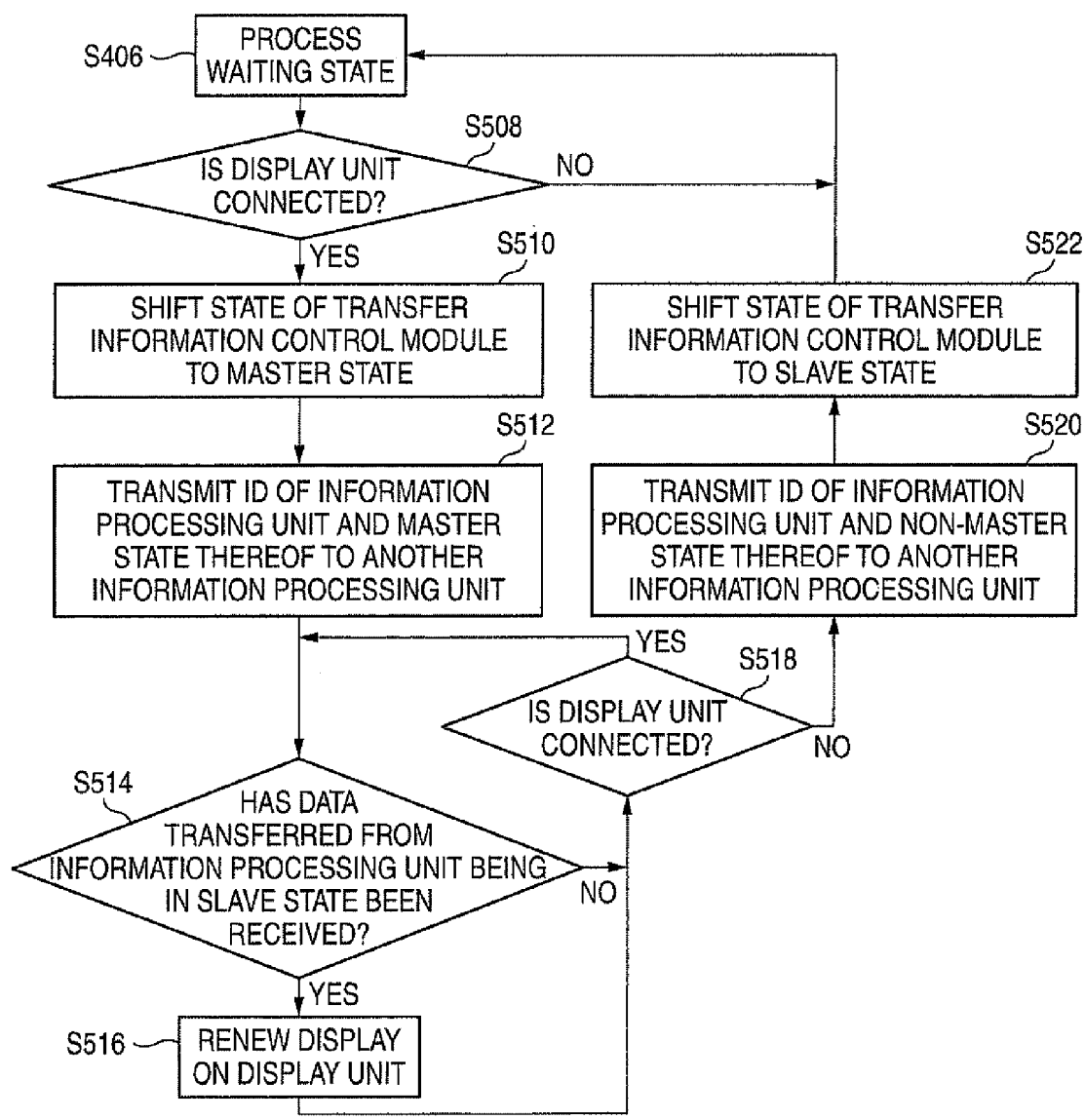
FIG. 5 is a flowchart showing a process example in the information processing unit.

FIG. 5 is a flowchart showing a process example in the information processing unit 110A.

Step S406 is the same as step S406 shown in the example in FIG. 4, and the information processing unit 110A is in the process waiting state in the initial state.

At step S508, the display unit connection detection module 116A judges whether the display unit 120 is connected to the information processing unit 110A. In the case that the display unit 120 is connected, the procedure advances to step S510. Otherwise, the procedure returns to step S406.

At step S510, the state of the transfer information control module (master) 112A is shifted from the slave state to the master state. More specifically, a value indicating a state is stored in a storage unit inside the information processing unit 110A, and the value is changed from a value indicating the slave state to a value indicating the master state.

At step S512, the transfer information control module (master) 112A transmits an ID (for example, an IP address) capable of uniquely identifying the information processing unit 110A and information indicating that the information processing unit 110A is in the master state to another information processing unit 110 (for example, the information processing unit 110B) via the communication module 111A. For example, broadcast transmission is performed.

At step S514, the transfer information control module (master) 112A judges whether the data transferred from an information processing unit 110 being in the slave state (for example, the information processing unit 110B) has been received via the communication module 111A. In the case that the data has been received, the procedure advances to step S516. Otherwise, the procedure advances to step S518.

At step S516, the transfer information control module (master) 112A displays the data received at step S514 on the display unit 120.

At step S518, the display unit connection detection module 116A judges whether the display unit 120 is connected to the information processing unit 110A. In the case that the display unit 120 is connected, the procedure returns to step S514. Otherwise (in the case that the connection is canceled), the procedure advances to step S520.

At step S520, the transfer information control module (master) 112A transmits the ID (for example, the IP address) capable of uniquely identifying the information processing unit 110A and information indicating that the information processing unit 110A is not in the master state to another information processing unit 110 (for example, the information processing unit 110B) via the communication module 111A. For example, broadcast transmission is performed.

At step S522, the state of the transfer information control module (master) 112A is shifted from the master state to the slave state. Then, the procedure returns to step S406.

Figure 6:
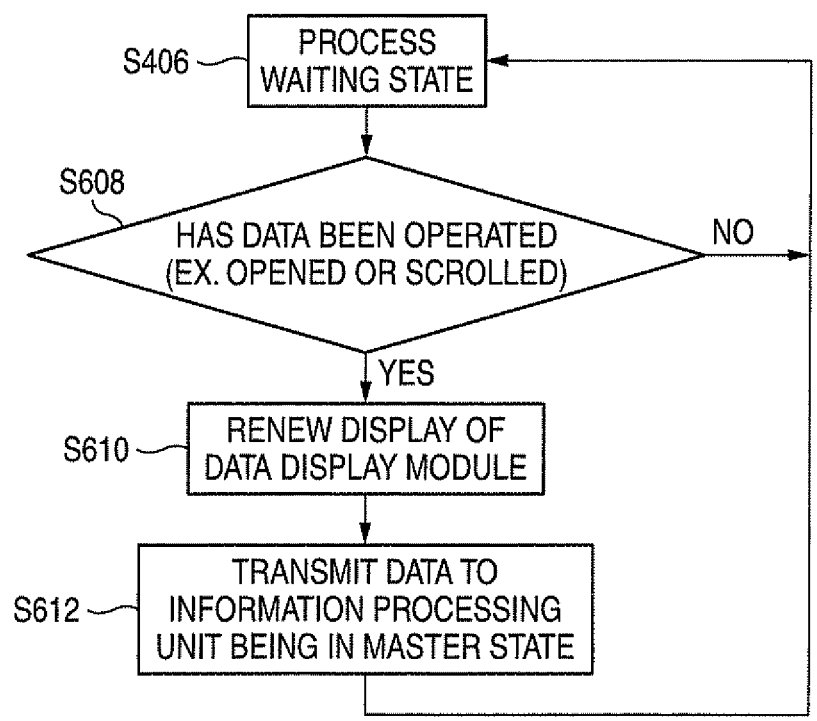
FIG. 6 is a flowchart showing another process example in the information processing unit.

FIG. 6 is a flowchart showing another process example in the information processing unit 110B. The information processing unit 110B is configured to display data not only on the display connected thereto but also on the display unit 120. This configuration is set in response to user's operation.

Step S406 is the same as step S406 shown in the example in FIG. 4, and the information processing unit 110B is in the process waiting state in the initial state.

At step S608, the data opening/closing instruction module 115B or the display data operation module 113B judges whether the data has been operated. In the case that the data has been operated, the procedure advances to step S610. Otherwise, the procedure returns to step S406. Data operation includes, for example, opening (starting data display), scrolling and closing (ending data display) performed by user's operation. In the case that the procedure advances to step S610, the data opening/closing instruction module 115B or the display data operation module 113B transfers the result of the operation to the data display module 114B and the transfer information control module (slave) 112B.

At step S610, the data display module 114B displays the result of the operation accepted at step S608 on the display connected to the information processing unit 110B.

At step S612, the transfer information control module (slave) 112B transmits the result of the operation accepted at step S608 to the information processing unit 110A via the communication module 111B. The information processing unit 110B has already received the ID of the information processing unit 110A being in the master state, which was transmitted at step S512 shown in the example in FIG. 5, and transmits the result of the operation to the information processing unit 110A, i.e., the destination of the transmission. Then, the result of the operation is received by the information processing unit 110A at step S514 shown in the example in FIG. 5.

Figure 7:
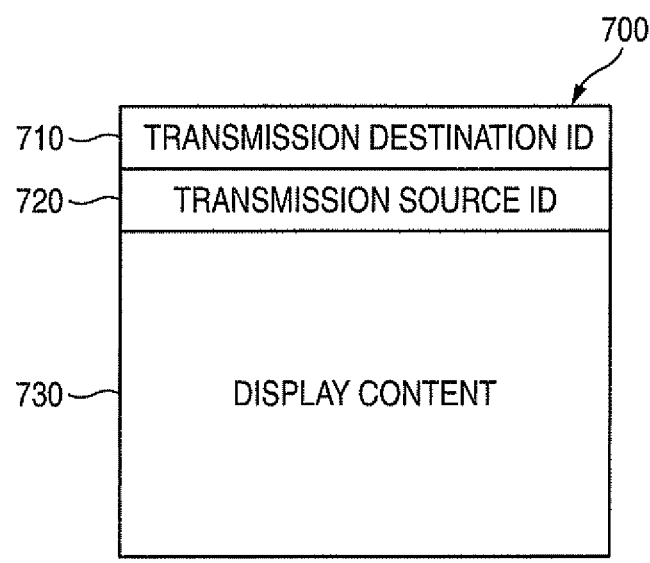
FIG. 7 is an explanatory view showing an example of the data configuration of transmission data.

Transmission data 700 is available as the data transmitted at step S612. FIG. 7 is an explanatory view showing an example of the data configuration of the transmission data 700. The transmission data 700 has a transmission destination ID column 710, a transmission source ID column 720 and a display content column 730.

The transmission destination ID column 710 stores the ID of the information processing unit 110 serving as the transmission destination (herein, the ID of the information processing unit 110A).

The transmission source ID column 720 stores the ID of the information processing unit 110 serving as the transmission source (herein, the ID of the information processing unit 110B).

The display content column 730 stores contents to be displayed on the display unit 120. As specific data stored in the display content column 730, display content data 800 is available, for example.

Figure 8:
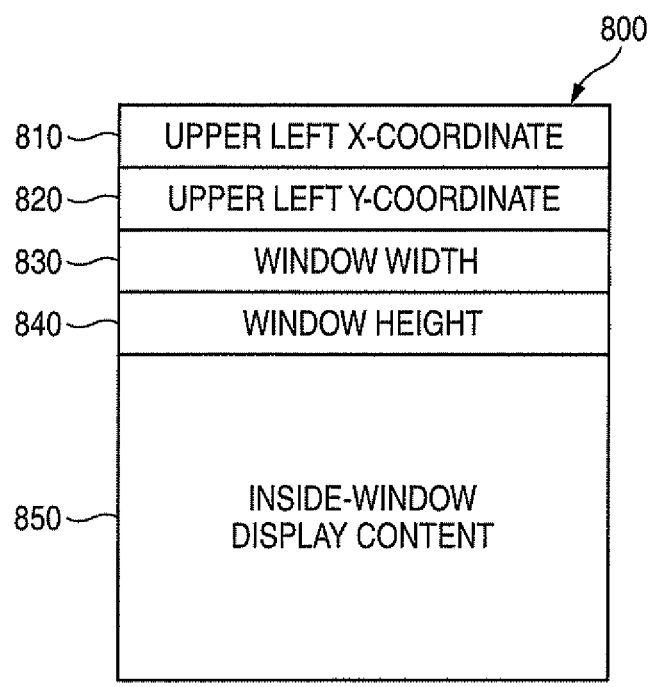
FIG. 8 is an explanatory view showing an example of the data configuration of display content data.

FIG. 8 is an explanatory view showing an example of the data configuration of the display content data 800. The display content data 800 has an upper left X-coordinate column 810, an upper left Y-coordinate column 820, a window width column 830, a window height column 840 and an inside-window display content column 850.

The upper left X-coordinate column 810 and the upper left Y-coordinate column 820 store the upper left position of a rectangular region (window) to be displayed.

The window width column 830 and the window height column 840 store the size of the rectangular region to be displayed.

The inside-window display content column 850 stores data serving as the contents to be displayed inside the rectangular region.

The transfer information control module (master) 112A of the information processing unit 110A receives these and displays them on the basis of the display content data 800. More specifically, the rectangular region defined by the data of the upper left X-coordinate column 810, the upper left Y-coordinate column 820, the window width column 830 and the window height column 840 is obtained, and the data stored in the inside-window display content column 850 is displayed in the rectangular region.

Furthermore, the displayed contents obtained by user's operation (scrolling, change in display position, selection, editing, etc.) of data having already been displayed by the display data operation module 113B are also transmitted to the information processing unit 110A according to the transmission data 700 and the display content data 800, and the transfer information control module (master) 112A of the information processing unit 110A displays the contents on the display unit 120 according to the data. In other words, the contents displayed on the display connected to the information processing unit 110B become coincident with the contents displayed on the display unit 120.

Furthermore, when the data opening/closing instruction module 115B accepts the closing operation, the display of the data having been displayed so far is completed. For example, 0 is set in the window width column 830 and the window height column 840 and the setting is transmitted to the information processing unit 110A, whereby the transfer information control module (master) 112A of the information processing unit 110A completes the display of the data being displayed on the display unit 120 according to the setting.

After this closing process, the information processing unit 110A waits for the opening operation to be performed by the data opening/closing instruction module 115 of an information processing unit 110 being in the slave state. In other words, the information processing unit 110A waits for data transfer from a new information processing unit 110 at step S514. As the new information processing unit 110, an information processing unit 110 different from the information processing unit 110 from which data has been transmitted so far (the difference is judged using the data stored in the transmission destination ID column 710 received) may be used, of course, or the same information processing unit 110 as the information processing unit 110 from which data has been transmitted so far may also be used.

Moreover, in the case that data to be displayed has been received from an information processing unit 110 different from the information processing unit 110 being currently used for display before the closing process is performed, the data may be abandoned or the data may be stored, and the stored data may be displayed after the closing process of the information processing unit 110 being currently used for display.

Figure 9:
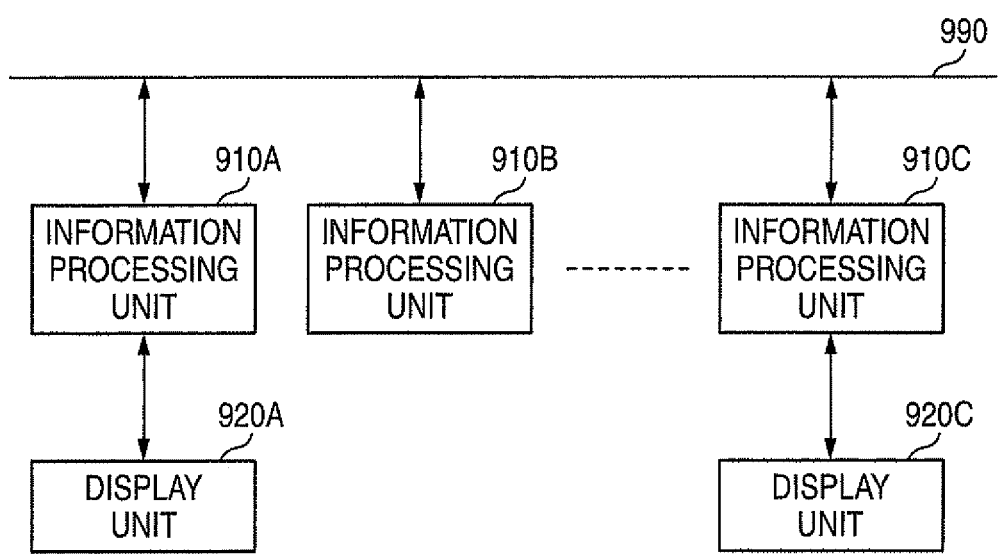
FIG. 9 is an explanatory view showing an example of the configuration of a system for achieving a second exemplary embodiment.

FIG. 9 is an explanatory view showing an example of the configuration of a system for achieving a second exemplary embodiment.

Information processing units 910A, 910B, 910C, etc. are connected via a communication line 990 so as to be able to communicate with one another. Multiple information processing units 910 (the information processing unit 910A and the information processing unit 910C in FIG. 9) among these information processing units are connected to display units 920 (a display unit 920A and a display unit 920C in FIG. 9). The second exemplary embodiment is different from the first exemplary embodiment in that the multiple information processing units 910 are connected to the display units 920. In the other respects, the second exemplary embodiment is equivalent to the first exemplary embodiment shown in the example in FIG. 1. The information processing unit 910C is equivalent to the information processing unit 910A, and the information processing unit 910A will be mainly described in the following description.

Figure 10:
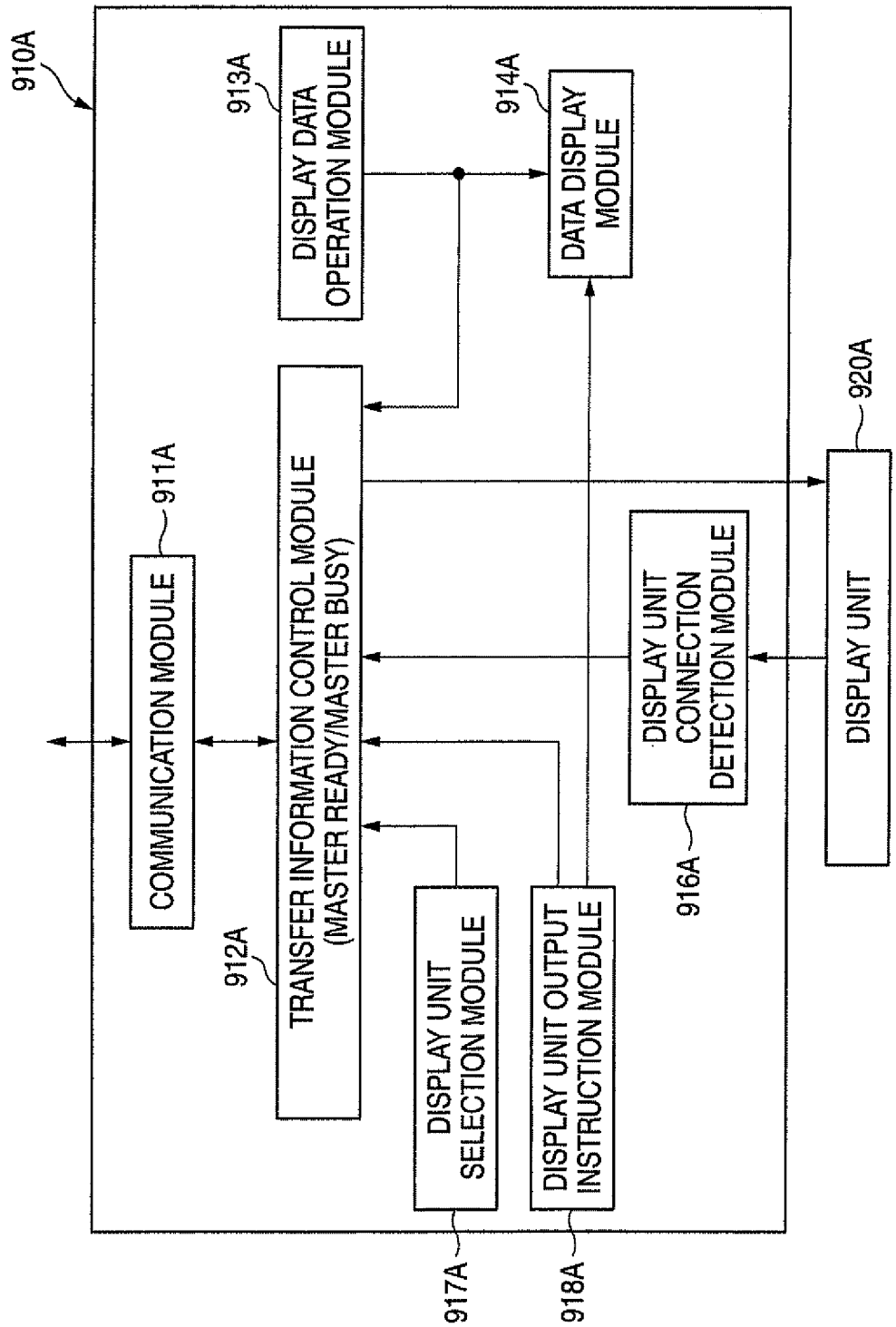
FIG. 10 is a conceptual module configuration view showing an example of the configuration of the second exemplary embodiment.

FIG. 10 is a conceptual module configuration view showing an example of the configuration of the second exemplary embodiment.

The information processing unit 910A has a communication module 911A, a transfer information control module (master ready/master busy) 912A, a display data operation module 913A, a data display module 914A, a display unit connection detection module 916A, a display unit selection module 917A and a display unit output instruction module 918A. The display unit 920A is connected to the transfer information control module (master ready/master busy) 912A and the display unit connection detection module 916A of the information processing unit 910A. The components of the first exemplary embodiment corresponding to the components of the second exemplary embodiment equivalent thereto are mentioned in the following description, and overlapping description of the components of the second exemplary embodiment is omitted.

The communication module 911A is connected to the transfer information control module (master ready/master busy) 912A and is equivalent to the communication module 111A of the first exemplary embodiment.

The display unit connection detection module 916A is connected to the transfer information control module (master ready/master busy) 912A and the display unit 920A and is equivalent to the display unit connection detection module 116A of the first exemplary embodiment.

The transfer information control module (master ready/ master busy) 912A is connected to the communication module 911A, the display data operation module 913A, the display unit connection detection module 916A, the display unit selection module 917A, the display unit output instruction module 918A and the display unit 920A. In the case that the information processing unit 910A has received information to be displayed on the external display unit 920A from another information processing unit 910 (for example, the information processing unit 910B) via the communication module 911A, the information processing unit 910A transmits the fact that the external display unit 920A is used to the other information processing units 910 (for example, the information processing unit 910B, the information processing unit 910C, etc.) via the communication module 911A. Then, the information processing unit 910A performs control to display the information transmitted from the information processing unit 910B on the external display unit 920A. In the case that the display unit connection detection module 916A has detected that the external display unit 920A is not connected (hereafter, this state is referred to as a slave state), this state will be described later by taking the information processing unit 910B shown in FIG. 11 as an example.

The transfer information control module (master ready/ master busy) 912A has three kinds of states: a slave state, a master ready state and a master busy state. In other words, not only the simple master state (a state indicating that the external display unit 920A is connected) in the above-mentioned first exemplary embodiment but also two kinds of master states are available as master states: a master ready state in which the external display unit 920A is connected and information to be displayed can be accepted from another information processing unit 910 and a master busy state in which the external display unit 920A is connected and information to be displayed cannot be accepted from another information processing unit 910. As more specific examples, the master ready state indicates that the display unit 920A is not yet used by any information processing units 910, and the master busy state indicates that the display unit 920A has already been used by another information processing unit 910.

Furthermore, on the basis of the predetermined number of the information processing units 910 and the number of the other information processing units 910 having transmitted information to be displayed on the external display unit 920A, the transfer information control module (master ready/master busy) 912A may transmit, to the other information processing units 910, the fact that the external display unit 920A is used. In other words, this configuration is adapted to deal with a case in which the display unit 920A can be used by the predetermined number (an integer of 1 or more) of the information processing units 910. For example, the predetermined number is compared with the number of the other information processing units 910 having transmitted information to be displayed on the external display unit 920A, and the state is set to the master ready state or the master busy state. As a more specific example, the master ready state indicates that the number of the information processing units 910 having used the external display unit 920A is less than the predetermined threshold value, and the master busy state indicates that the number of the information processing units 910 having already used the external display unit 920A is not less than the predetermined threshold value.

The display unit output instruction module 918A is connected to the transfer information control module (master ready/master busy) 912A and the data display module 914A. The display unit output instruction module 918A instructs to output data (for example, electronic documents, etc. stored inside the information processing unit 910A) to the display unit in response to the operation of the user of the information processing unit 910A. Furthermore, the display unit output instruction module 918A transfers the contents of the data to the data display module 914A to display the contents on the display of the information processing unit 910A. Moreover, in the case that the contents of the data are also displayed on the display unit 920A connected to the information processing unit 910A, the display unit output instruction module 918A also transfers the contents of the data to the transfer information control module (master ready/master busy) 912A.

The display unit selection module 917A is connected to the transfer information control module (master ready/master busy) 912A. In the case that the number of other information processing units 910 to which the display units 920 are connected is plural, the display unit selection module 917A selects the output destination of data from among the other information processing units 910 in response to the operation of the user of the information processing unit 910A. Then, the display unit selection module 917A transfers the result of the selection to the transfer information control module (master ready/master busy) 912A. In the case that the display unit connection detection module 916A has detected that the external display unit 920A is connected, the display unit selection module 917A may make a selection in response to the operation of the user as to whether the data is output to the display unit 920A.

The display data operation module 913A is connected to the transfer information control module (master ready/master busy) 912A and the data display module 914A. The display data operation module 913A is equivalent to the display data operation module 113A of the first exemplary embodiment.

The data display module 914A is connected to the display data operation module 913A and the display unit output instruction module 918A. The data display module 914A is equivalent to the data display module 114A of the first exemplary embodiment.

Figure 11:
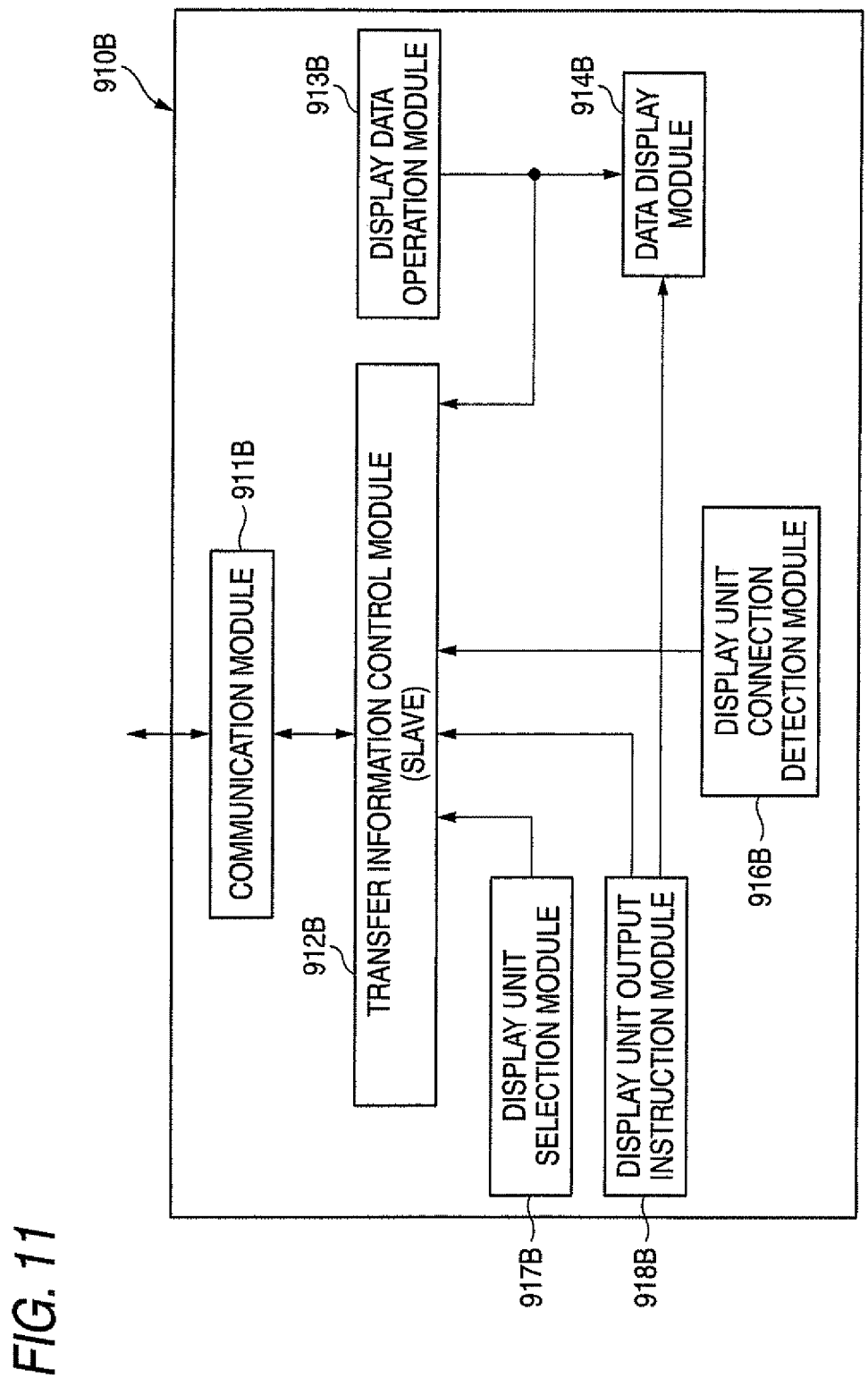
FIG. 11 is a conceptual module configuration view showing another example of the configuration of the second exemplary embodiment.

FIG. 11 is a conceptual module configuration view showing another example of the configuration of the second exemplary embodiment. The information processing unit 910B shown in the example in FIG. 11 is different from the information processing unit 910A shown in the example in FIG. 10 in that the display unit 920A is not connected. The other modules of the information processing unit 910B are basically the same as those of the information processing unit 910A. In other words, when the display unit 920A is connected, the information processing unit 910B operates as the information processing unit 910A; when the display unit 920A is not connected, the information processing unit 910B operates in its own way.

The information processing unit 910B has a communication module 911B, a transfer information control module (slave) 912B, a display data operation module 913B, a data display module 914B, a display unit connection detection module 916B, a display unit selection module 917B and a display unit output instruction module 918B.

The communication module 911B is connected to the transfer information control module (slave) 912B and is equivalent to the communication module 111B of the first exemplary embodiment.

The display unit connection detection module 916B is connected to the transfer information control module (slave) 912B and is equivalent to the display unit connection detection module 116B of the first exemplary embodiment.

The transfer information control module (slave) 912B is connected to the communication module 911B, the display data operation module 913B, the display unit connection detection module 916B, the display unit selection module 917B and the display unit output instruction module 918B.

The display unit connection detection module 916B is equivalent to the display unit connection detection module 116B of the first exemplary embodiment. The information processing unit 910B transmits information to be displayed on the display unit 920 to another information processing unit 910 selected by the display unit selection module 917B.

The display unit output instruction module 918B is connected to the transfer information control module (slave) 912B and the data display module 914B. The display unit output instruction module 918B instructs to output data (for example, electronic documents, etc. stored in the information processing unit 910B) in response to the operation of the user of the information processing unit 910B. Then, the display unit output instruction module 918B transfers the contents of the data to the data display module 914B so that the contents are displayed on the display of the information processing unit 910B. Furthermore, the display unit output instruction module 918B also transfers the contents of the data to the transfer information control module (slave) 912B in the case that the contents are also displayed on the display unit 920 connected to another information processing unit 910.

The display unit selection module 917B is connected to the transfer information control module (slave) 912B. In the case that the display unit connection detection module 916B detects that the external display unit 920 is not connected and that the number of other information processing units 910 to which the display units 920 are connected is plural, the display unit selection module 917B selects another information processing unit 910 in response to the operation of the user. Then, the display unit selection module 917B transfers the result of the selection to the transfer information control module (slave) 912B. The other information processing unit 910 to be selected may include the display unit 920 connected thereto. In other words, an information processing unit 910 serving as the destination of the transmission should only be included as an object to be selected. Furthermore, an information processing unit 910 or the display unit 920A connected thereto may be presented to the user as the object to be selected. The information processing unit to be selected finally is the transmission destination of information to be displayed.

The case in which the number of other information processing units 910 to which the display units 920 are connected is plural is, as a more specific example, a case in which the transfer information control module (slave) 912B has received, from multiple other information processing units 910 via the communication module 911B, the fact that the current state is the master ready state.

The display data operation module 913B is connected to the transfer information control module (slave) 912B and the data display module 914B and is equivalent to the display data operation module 113B of the first exemplary embodiment.

The data display module 914B is connected to the display data operation module 913B and the display unit output instruction module 918B and is equivalent to the data display module 114B of the first exemplary embodiment.

Figure 12:
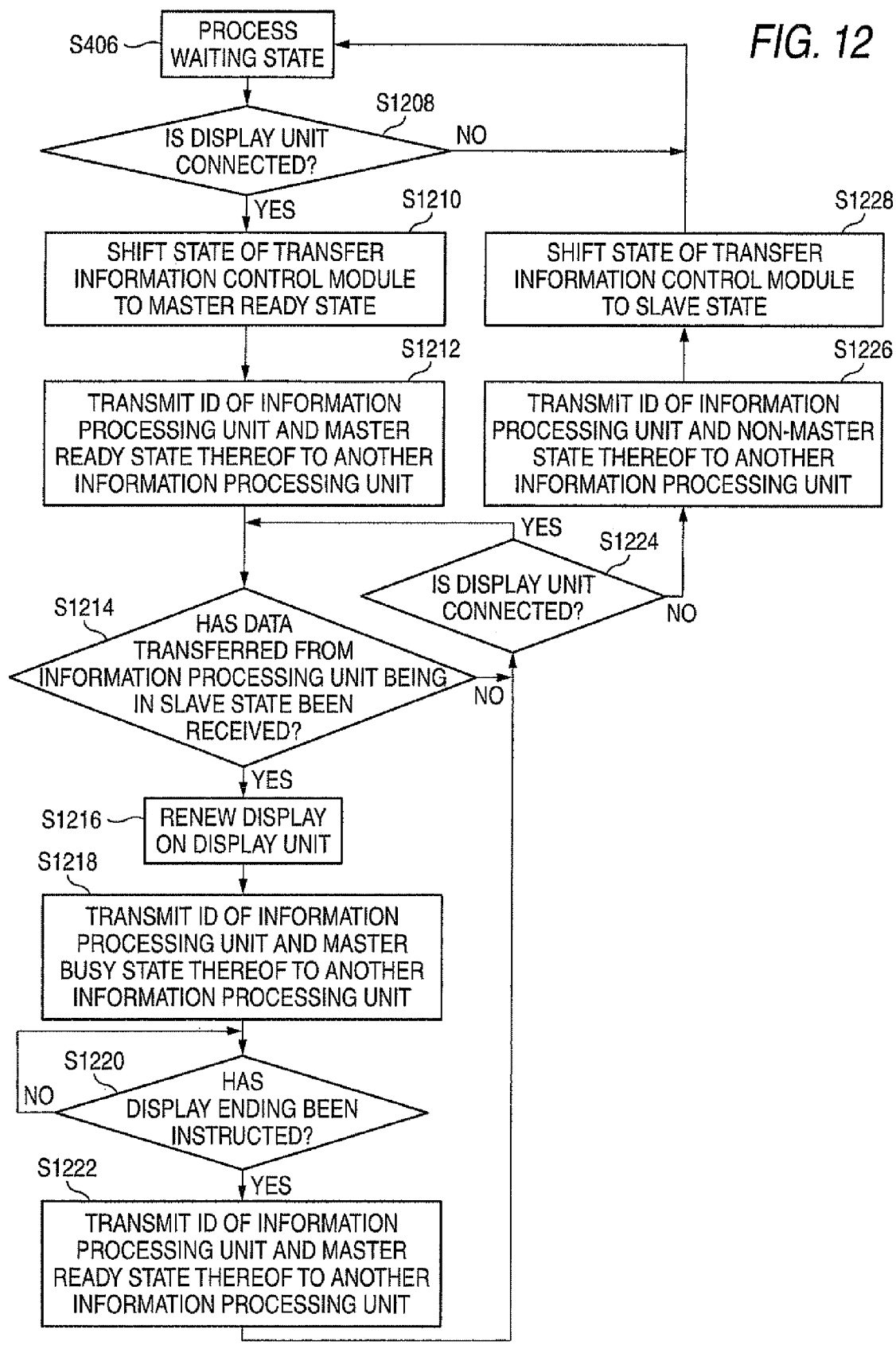
FIG. 12 is a flowchart showing a process example in the information processing unit.

FIG. 12 is a flowchart showing a process example in the information processing unit 910A. A case is herein described in which one is the predetermined number (the number of the information processing units 910 capable of displaying information on the display unit 920A). The process example in the initial state is equivalent to that in the first exemplary embodiment (refer to the process example shown in FIG. 4).

Step S406 is the same as step S406 shown in the example in FIG. 4, and the information processing unit 910A is in the process waiting state in the initial state.

At step S1208, the display unit connection detection module 916A judges whether the display unit 920A is connected to the information processing unit 910A. In the case that the display unit 920A is connected, the procedure advances to step S1210. Otherwise, the procedure returns to step S406.

At step S1210, the state of the transfer information control module (master ready/master busy) 912A is shifted from the slave state to the master ready state. More specifically, a value indicating a state is stored in a storage unit inside the information processing unit 910A, and the value is changed from a value indicating the slave state to a value indicating the master ready state.

At step S1212, the transfer information control module (master ready/master busy) 912A transmits an ID (for example, an IP address) capable of uniquely identifying the information processing unit 910A and information indicating that the information processing unit 910A is in the master ready state to another information processing unit 910 (for example, the information processing unit 910B) via the communication module 911A. For example, broadcast transmission is performed.

At step S1214, the transfer information control module (master ready/master busy) 912A judges whether the data transferred from an information processing unit 910 being in the slave state (for example, the information processing unit 910B) has been received via the communication module 911A. In the case that the data has been received, the procedure advances to step S1216. Otherwise, the procedure advances to step S1224.

At step S1216, the transfer information control module (master ready/master busy) 912A displays the data received at step S1214 on the display unit 920A.

At step S1218, the transfer information control module (master ready/master busy) 912A transmits an ID (for example, an IP address) capable of uniquely identifying the information processing unit 910A and information indicating that the information processing unit 910A is in the master busy state to another information processing unit 910 (for example, the information processing unit 910B) via the communication module 911A. For example, broadcast transmission is performed.

At step S1220, the transfer information control module (master ready/master busy) 912A judges whether a display ending instruction has been received from the information processing unit 910 that transmitted the data. In the case that the display ending instruction has been received, the procedure advances to step S1222. Otherwise, the transfer information control module (master ready/master busy) 912A waits for the reception of the display ending instruction. This conforms to a protocol in which the display ending instruction is transmitted each time data to be displayed is transmitted. The procedure may return to step S1214 in the case that no display ending instruction is transmitted so as to conform to another protocol in which data transmission is permitted multiple times continuously and then a display ending instruction is transmitted.

At step S1222, the transfer information control module (master ready/master busy) 912A transmits an ID (for example, an IP address) capable of uniquely identifying the information processing unit 910A and information indicating that the information processing unit 910A is in the master ready state to another information processing unit 910 (for example, the information processing unit 910B) via the communication module 911A. For example, broadcast transmission is performed.

At step S1224, the display unit connection detection module 916A judges whether the display unit 920A is connected to the information processing unit 910A. In the case that the display unit 920A is connected, the procedure returns to step S1214. Otherwise (in the case that the connection is canceled), the procedure advances to step S1226.

At step S1226, the transfer information control module (master ready/master busy) 912A transmits the ID (for example, the IP address) capable of uniquely identifying the information processing unit 910A and information indicating that the information processing unit 910A is not in the master states (the master ready state and the master busy state) to another information processing unit 910 (for example, the information processing unit 110B) via the communication module 911A. For example, broadcast transmission is performed.

At step S1228, the state of the transfer information control. Then, the procedure returns to step S406.

Figure 13:
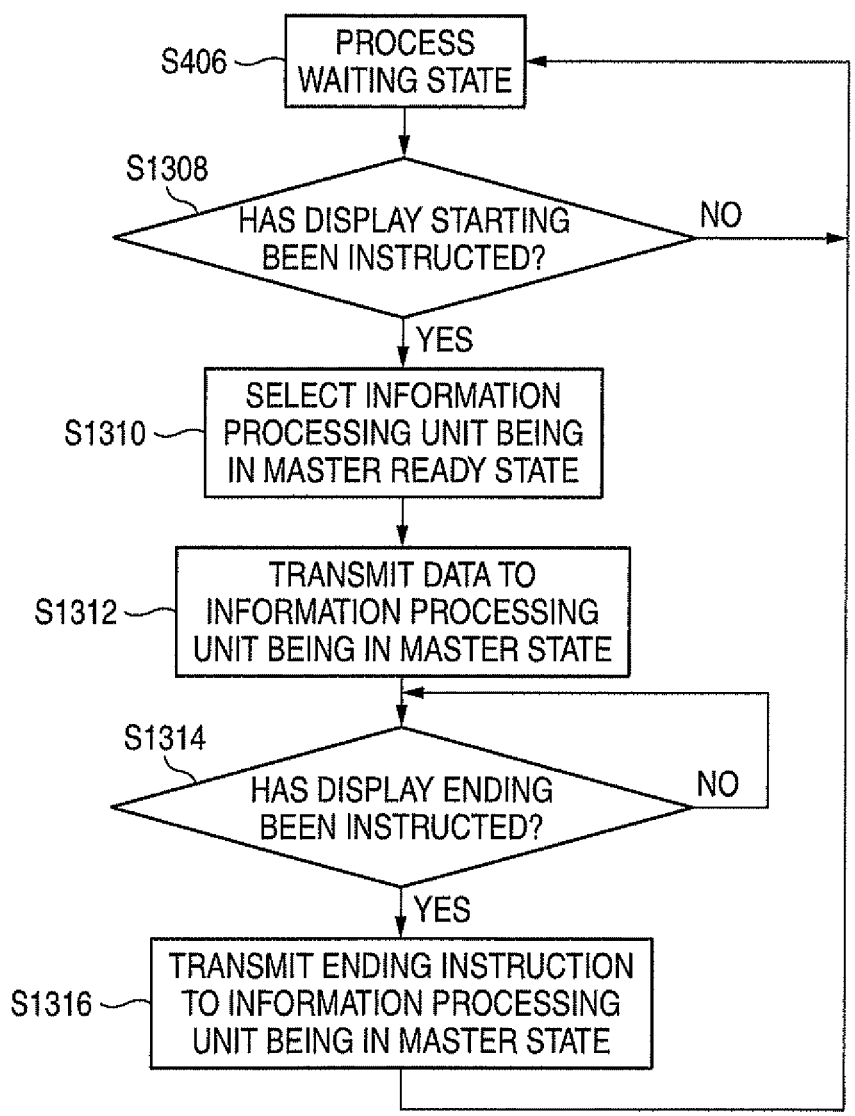
FIG. 13 is a flowchart showing another process example in the information processing unit.

FIG. 13 is a flowchart showing another process example in the information processing unit 910B.

Step S406 is the same as step S406 shown in the example in FIG. 4, and the information processing unit 910B is in the process waiting state in the initial state.

At step S1308, the display unit output instruction module 918B judges whether a data display starting instruction has been accepted. In the case that the data display starting instruction has been accepted, the procedure advances to step S1310. Otherwise, the procedure returns to step S406.

At step S1310, the display unit selection module 917B selects one of the information processing units 910 being in the master ready state. Before this process, the transfer information control module (slave) 912B receives the IDs of the information processing units 910 being in the master ready state. Then, the display unit selection module 917B displays the list of the information processing units 910 being in the master ready state on the display of the information processing unit 910B and makes a selection in response to the operation of the user. Furthermore, the number of the information processing units 910 to be selected may be one or more than one. The state of the selected information processing unit 910 is shifted from the master ready state to the master busy state.

At step S1312, the transfer information control module (slave) 912B transmits the data to be displayed as instructed at step S1308 to the information processing unit 910 selected at step S1310.

At step S1314, the transfer information control module (slave) 912B judges whether a display ending instruction has been issued from the display unit output instruction module 918B or the display data operation module 913B. In the case that the display ending instruction has been issued, the procedure advances to step S1316. Otherwise, the transfer information control module (slave) 912B waits for the reception of the display ending instruction. This conforms to a protocol in which the display ending instruction is transmitted each time data to be displayed is transmitted. The procedure may return to step S1312 in the case that no display ending instruction is transmitted so as to conform to another protocol in which data transmission is permitted multiple times continuously and then a display ending instruction is transmitted.

At step S1316, the transfer information control module (slave) 912B transmits the display ending instruction to the information processing unit 910 to which the data was transmitted.

Figure 14:
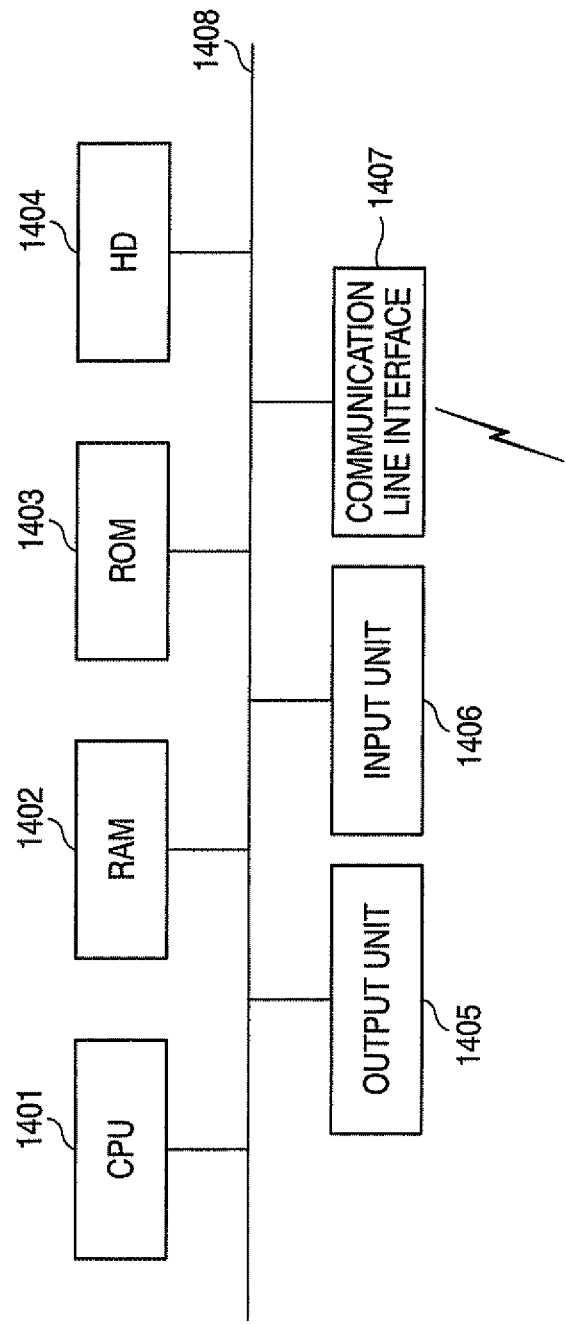
FIG. 14 is a block diagram showing an example of the hardware configuration of a computer for achieving the first and second exemplary embodiments.

The hardware configuration of a computer in which programs according to the above-mentioned exemplary embodiments are executed is that of a general computer as shown in FIG. 14. More specifically, the computer is a personal computer or the like. In other words, as specific examples, a CPU 1401 is used as a processing section (arithmetic section), and a RAM 1402, a ROM 1403 and an HD 1404 are used as storage units. For example, a hard disk drive may also be used as the HD 1404. The computer includes the CPU 1401 for executing programs for the transfer information control module (master) 112A, the transfer information control module (slave) 112B, the display data operation module 113A, the display data operation module 113B, etc.; the RAM 1402 for storing the programs and data; the ROM 1403 in which programs, etc. for starting the computer are stored; the HD 1404 serving as an auxiliary storage unit; an input unit 1406 for inputting data, such as a keyboard and a mouse; an output unit 1405, such as a CRT or a liquid crystal display; a communication line interface 1407 for making a connection to a communication network, such as a network interface card; and a bus 1408 for connecting these components to perform data transmission. The display unit 120, such as a projector, can be connected to the computer, and the connection is detected by the display unit connection detection module 116A, etc. Furthermore, multiple units of this computer may be connected to one another via a network.

Among the above-mentioned exemplary embodiments, the exemplary embodiment relating to computer programs is achieved by enabling a system having this hardware configuration to read the computer programs serving as software and by allowing the software and hardware resources to cooperate mutually.

The hardware configuration shown in FIG. 14 is just one example, and the above-mentioned exemplary embodiment is not limited to the configuration shown in FIG. 14 but should only have a configuration in which the modules described in the above-mentioned exemplary embodiment can be implemented. For example, some modules may each be formed of special-purpose hardware (for example, an ASIC), or some modules may be disposed inside an external system and connected via a communication line. Furthermore, multiple units of the system shown in FIG. 14 may be connected to one another via a communication line so as to cooperate mutually. Moreover, in particular, the hardware configuration may be incorporated in home information appliances, portable information processing units, etc. as well as personal computers.

Although the information processing unit 110A and the information processing unit 110B are separate units in the description of the above-mentioned first exemplary embodiment, since the information processing unit 110A and the information processing unit 110B each have equivalent modules and respectively perform different processes depending on whether the display unit 120 is connected thereto, the modules may be formed of the combinations of the modules corresponding to both units. This is also applicable to the information processing unit 910A and the information processing unit 910B in the above-mentioned second exemplary embodiment.

Furthermore, in the descriptions of the above-mentioned exemplary embodiments, a value that is "not less than", "not more than", "larger than" or "smaller than (less than)" a predetermined value may also be described such that the value is "larger than", "smaller than (less than)", "not less than" or "not more than" the predetermined value, respectively, unless contradictions are encountered in the combinations of these.

Moreover, the above-mentioned various kinds of exemplary embodiments may also be combined, and the technologies described in the background art may also be adopted as technologies for carrying out the processes performed by the respective modules.

The programs described above may be provided in a form stored on recording media or provided through a communication network. In the case that the programs are provided on recording media, the programs described above may also be regarded as the invention of "computer readable recording media on which programs are recorded."

The "computer readable recording media on which programs are recorded" are computer readable recording media on which programs are recorded and which are used to install, execute and distribute the programs.

Examples of the recording media may include digital versatile discs (DVDs), such as "DVD-R, DVD-RW and DVD-RAM" conforming to the standards established by the DVD Forum and such as "DVD+R and DVD+RW" conforming to the standards established by DVD+RW Alliance; compact discs (CDs), such as a read-only memory (CD-ROM), a CD-recordable (CD-R) and a CD-rewritable (CD-RW); a Blue-ray Disc (registered trademark); a magnet-optical disc (MO); a flexible disc (FD); a magnet tape; a hard disk drive; a read-only memory (ROM); an electrically erasable programmable read-only memory (EEPROM); a flash memory; and a random access memory.

Furthermore, the above-mentioned programs or part thereof may be recorded on the above-mentioned recording media, and stored and distributed. Moreover, the programs may be transmitted through communication, for example, through a wired/wireless network for use in a local area network (LAN), a metropolitan area network (MAN), a wide area network (WAN), the Internet, an intranet or an extranet, or a combination of these, or may also be transmitted on a carrier.

Besides, the above-mentioned programs may be part of another program or may be recorded on a recording medium together with other programs. In addition, the programs may also be recorded on multiple recording media in a divided manner. Still further, the programs may also be recorded in any form, such as a compressed or encrypted form, provided that the programs can be recovered.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
   a first information processing unit of a plurality of information processing units; and
   a second information processing unit of the plurality of information processing units that is connected to the first information processing unit so as to be communicable therewith,
   wherein the first information processing unit includes:
      a first display unit detection unit that is configured to detect whether a projector is connected to the first information processing unit;
      a first transmission unit that is configured to transmit, to the plurality of information processing units, a fact that the projector is connected, when the first display unit detection unit detects that the projector is connected; and a control unit that is configured to control display of information transmitted from the second information processing unit of the plurality of information processing units on the projector, and wherein the second information processing unit includes:

a second display unit detection unit that is configured to detect whether or not the projector is directly connected to the second information processing unit; and a second transmission unit that is configured to transmit, to the first information processing unit to which the projector is connected, the information to be displayed on the projector when the second display unit detection unit detects that the projector is not currently connected to the second information processing unit, wherein the information transmitted from the second information processing unit includes a transmission destination ID, transmission source ID and display content data which includes coordinates and dimensions of a window to be displayed by the projector and display content of the window.

2. An information processing unit communicable with other information processing units, comprising:

a display unit detection unit that is configured to detect whether a projector is connected to the information processing unit;

a first transmission unit that is configured to transmit, to said other information processing units, a fact that the projector is connected to the information processing unit under the condition that the display unit detection unit detects that the projector is currently connected to the information processing unit;

a control unit that is configured to control display of information respectively transmitted from said other information processing units on the projector, the projector being not currently connected to said other information processing units;

a second transmission unit, wherein the control unit compares an actual number of the other information processing units that currently transmit information to be displayed on the projector being currently connected to the information processing unit with a predetermined number, and when the comparison shows the actual number being greater than or equal to the predetermined number, the control unit causes the second transmission unit to transmit to the other information processing units an indication that the information processing unit cannot accept the information to be displayed on the projector any more from other information processing units, each of the information transmitted from said other information processing units includes a transmission destination ID, transmission source ID and display content data which includes coordinates and dimensions of a window to be displayed by the projector and display content of the window.

3. A non-transitory computer readable medium storing a program causing a computer to execute a process for information processing of an information processing unit communicable with other information processing units, the process comprising:

detecting whether a projector is connected to the information processing unit;

transmitting, to said other information processing units, a fact that the projector is connected to the information processing unit under the condition that the detection indicates that the projector is currently connected to the information processing unit;

controlling display of information respectively transmitted from said other information processing units on the projector, the projector being not currently connected to said other information processing units, wherein the controlling includes comparing an actual number of the other information processing units that currently transmit information to be displayed on the projector with a predetermined number, when the comparison shows the actual number being greater than or equal to the predetermined number, transmitting an indication that the information processing unit cannot accept the information to be displayed on the projector any more from the other information processing units to said other information processing units, each of the information transmitted from said other information processing units includes a transmission destination ID, transmission source ID and display content data which includes coordinates and dimensions of a window to be displayed by the projector and display content of the window.

* * * * *